(12) United States Patent
Wiese

(10) Patent No.: US 7,311,061 B1
(45) Date of Patent: *Dec. 25, 2007

(54) TELESCOPING FLAGPOLE

(76) Inventor: Michael J. Wiese, 26835 Oak Ridge Way, Elko, MN (US) 55020

( * ) Notice: Subject to any disclaimer, the term of this patent is extended or adjusted under 35 U.S.C. 154(b) by 145 days.

This patent is subject to a terminal disclaimer.

(21) Appl. No.: 11/235,903

(22) Filed: Sep. 27, 2005

Related U.S. Application Data

(63) Continuation of application No. 10/688,620, filed on Oct. 17, 2003, now Pat. No. 6,951,185.

(51) Int. Cl.
 *G09F 17/00* (2006.01)
 *F16B 7/10* (2006.01)

(52) U.S. Cl. .................... 116/173; 403/109.2; 403/349

(58) Field of Classification Search ............... 116/173, 116/174, 28 R; 248/125.8, 161, 404, 407; 403/109.1, 109.2, 109.3, 109.5, 348, 349, 403/350, 377; 40/607.04
See application file for complete search history.

(56) References Cited

U.S. PATENT DOCUMENTS

| | | | |
|---|---|---|---|
| 811,209 A | 1/1906 | Farrell ........................ 403/349 |
| 859,233 A | 7/1907 | Lane | |
| 918,579 A | 4/1909 | Murch ........................ 248/353 |
| 993,121 A | 5/1911 | Stone et al. ................. 403/300 |
| 1,288,060 A | 12/1918 | Le Duc ........................ 116/173 |
| 2,483,396 A | 10/1949 | Benson ........................ 403/107 |
| 2,604,088 A | 6/1952 | Burgess ....................... 248/539 |
| 2,947,557 A | 8/1960 | Schwab et al. ............. 403/326 |
| 2,989,329 A | 6/1961 | Noah ........................... 403/107 |
| 3,153,252 A | 10/1964 | Ricciardi .................... 15/144.4 |
| 3,423,781 A | 1/1969 | Henson ........................ 15/145 |
| 3,474,833 A | 10/1969 | Garrette Jr. et al. ......... 138/120 |
| RE26,779 E | 2/1970 | Weichenrieder ........... 116/63 R |
| 3,596,946 A | 8/1971 | Burton et al. ............ 403/109.5 |
| 3,675,615 A | 7/1972 | Stangarone et al. | |
| 3,738,075 A | 6/1973 | Nansel ........................ 52/115 |
| 4,079,555 A | 3/1978 | Barnes | |
| 4,299,421 A | 11/1981 | Bontrager ................. 296/26.05 |
| 4,406,097 A | 9/1983 | Meston | |
| 4,464,078 A | 8/1984 | Vorobyov | |
| 4,518,162 A | 5/1985 | Oates ........................... 482/93 |
| 4,800,834 A | 1/1989 | Feng ........................... 116/173 |
| 4,918,896 A | 4/1990 | Wiese | |
| 5,343,825 A | 9/1994 | Gazecimeon et al. ....... 116/173 |
| 5,485,700 A | 1/1996 | Van Vranken | |
| 5,540,017 A | 7/1996 | Eilam et al. | |
| 5,572,835 A | 11/1996 | Atkins et al. | |
| 5,741,084 A | 4/1998 | Del Rio et al. ............. 403/349 |
| 6,287,042 B1 | 9/2001 | Eriksson | |
| 6,343,568 B1 | 2/2002 | McClasky ................... 119/428 |
| 6,494,636 B1 | 12/2002 | Mozena ................... 403/109.2 |
| 6,595,226 B2 | 7/2003 | Uemura ....................... 135/75 |
| 6,695,266 B1 | 2/2004 | Tsai ........................ 248/125.8 |
| 6,951,185 B1 * | 10/2005 | Wiese ........................ 116/173 |
| 2002/0037192 A1 | 3/2002 | Eriksson | |
| 2002/0141812 A1 | 10/2002 | Edelen et al. ............ 403/109.1 |
| 2006/0081739 A1* | 4/2006 | Meissner .................... 248/161 |

* cited by examiner

*Primary Examiner*—R. Alexander Smith

(57) ABSTRACT

A telescopic flagpole for reducing the manual force required to extend and secure multiple segments. The flagpole includes a plurality of segments including a bottom segment, at least one intermediate segment, and a top segment; a plurality of sleeve assemblies each positioned between an associated pairing of a relatively lower segment and a relatively higher segment; and a plurality of biasing members each urging an associate one of the segments toward an extended position.

14 Claims, 7 Drawing Sheets

US 7,311,061 B1

TELESCOPING FLAGPOLE

CROSS REFERENCE TO RELATED APPLICATION

This application is a continuation of application Ser. No. 10/688,620, filed Oct. 17, 2003 now U.S. Pat. No. 6,951,185, which is incorporated by reference herein in its totality.

BACKGROUND OF THE INVENTION

1. Field of the Invention

The present invention relates to telescopic flagpoles and more particularly pertains to a new flag pole for providing enhanced access to a flag being displayed and improved manual extension and retraction capabilities.

2. Description of the Prior Art

The use of flagpoles is known in the prior art. Illustrative examples of such devices include: U.S. Pat. No. 4,406,097; U.S. Pat. No. 5,540,017; U.S. Pat. No. 5,572,835; U.S. Pat. No. 4,918,896; U.S. Pat. No. 859,233; U.S. Pat. No. 5,485,700; U.S. Pat. No. 6,287,042; U.S. Pat. No. 4,079,555; U.S. Pat. No. 4,464,078; U.S. Pat. No. 3,675,615; U.S. Patent Application: 2002/0037192.

While these devices fulfill their respective, particular objectives and requirements, the need remains for a assembly which requires reduced manual force to extend and secure multiple segments in a telescoping arrangement.

SUMMARY OF THE INVENTION

The basic configuration of a telescopic flagpole in general and a lanyard-free telescopic flag pole in particular have been described thoroughly in the specification of U.S. Pat. No. 4,918,896 issued to Harold Wiese. The specification of the U.S. Pat. No. 4,918,896 patent is hereby and herewith incorporated by reference into this disclosure.

The present invention overcomes a limitation of the prior designs, specifically the force necessary to lift the various segments into position. As the number of intermediate segments in the telescopic flagpole increase, and/or the overall span of the segments increases, it becomes increasingly difficult to manually lift the segments into position. Additionally, securing the segments in an extended position also becomes more difficult. The present invention provides a series of biasing means to assist in positioning the segments into their extended position. Further, the present invention provides a locking system which aides in the retention of the segments in their extending positions. Finally, by implementing a twist to engage/disengage structure in the locking system, the manual extension and securing of the telescopic flagpole is significantly enhanced.

To this end, the present invention generally comprises a plurality of segments including a bottom segment, at least one intermediate segment, and a top segment; a plurality of sleeve assemblies each positioned between an associated pairing of a relatively lower segment and a relatively higher segment; and a plurality of biasing means each urging an associate one of the segments toward an extended position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
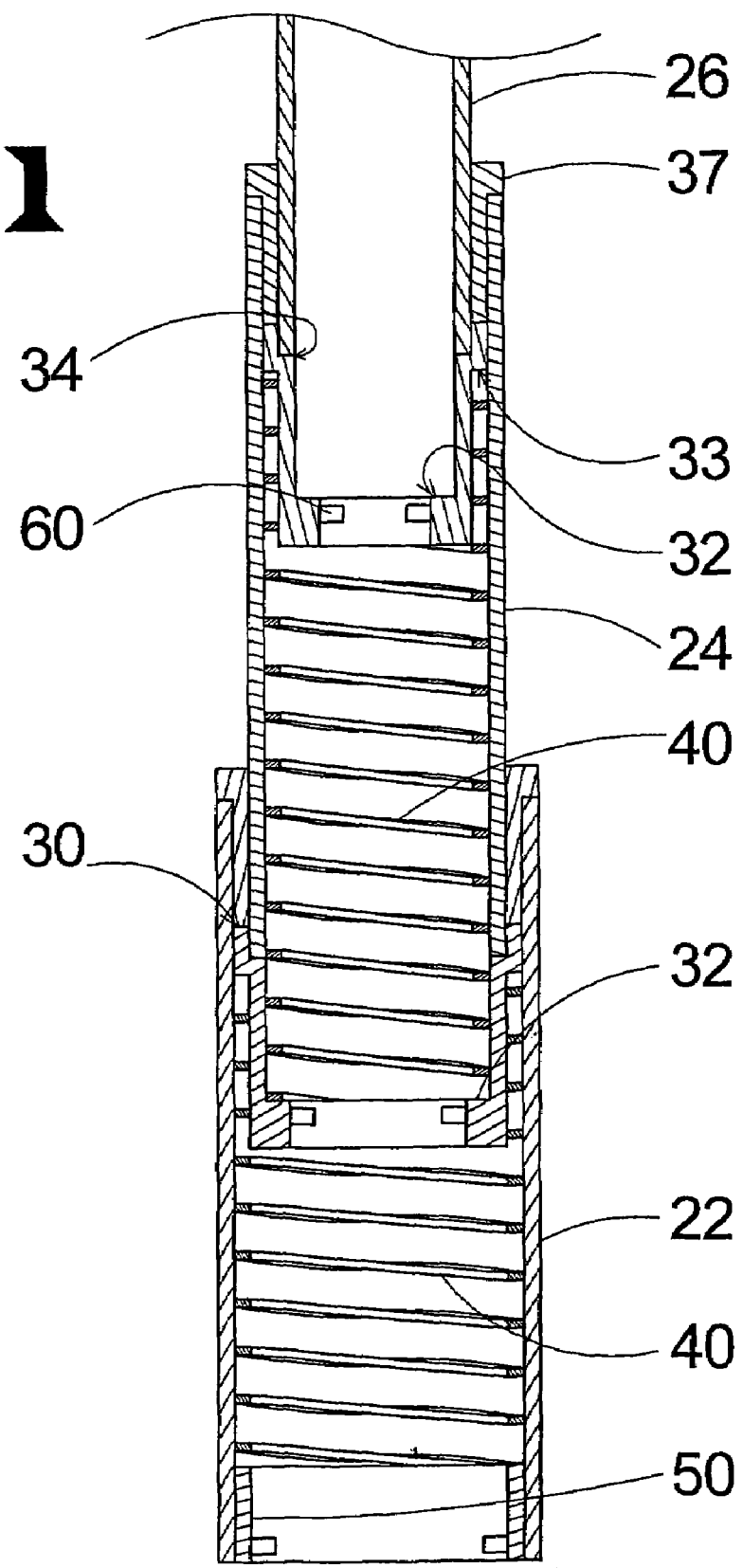
FIG. 1 is a schematic partial cross-sectional view of a new flag pole in an extended position according to the present invention.
Figure 2:
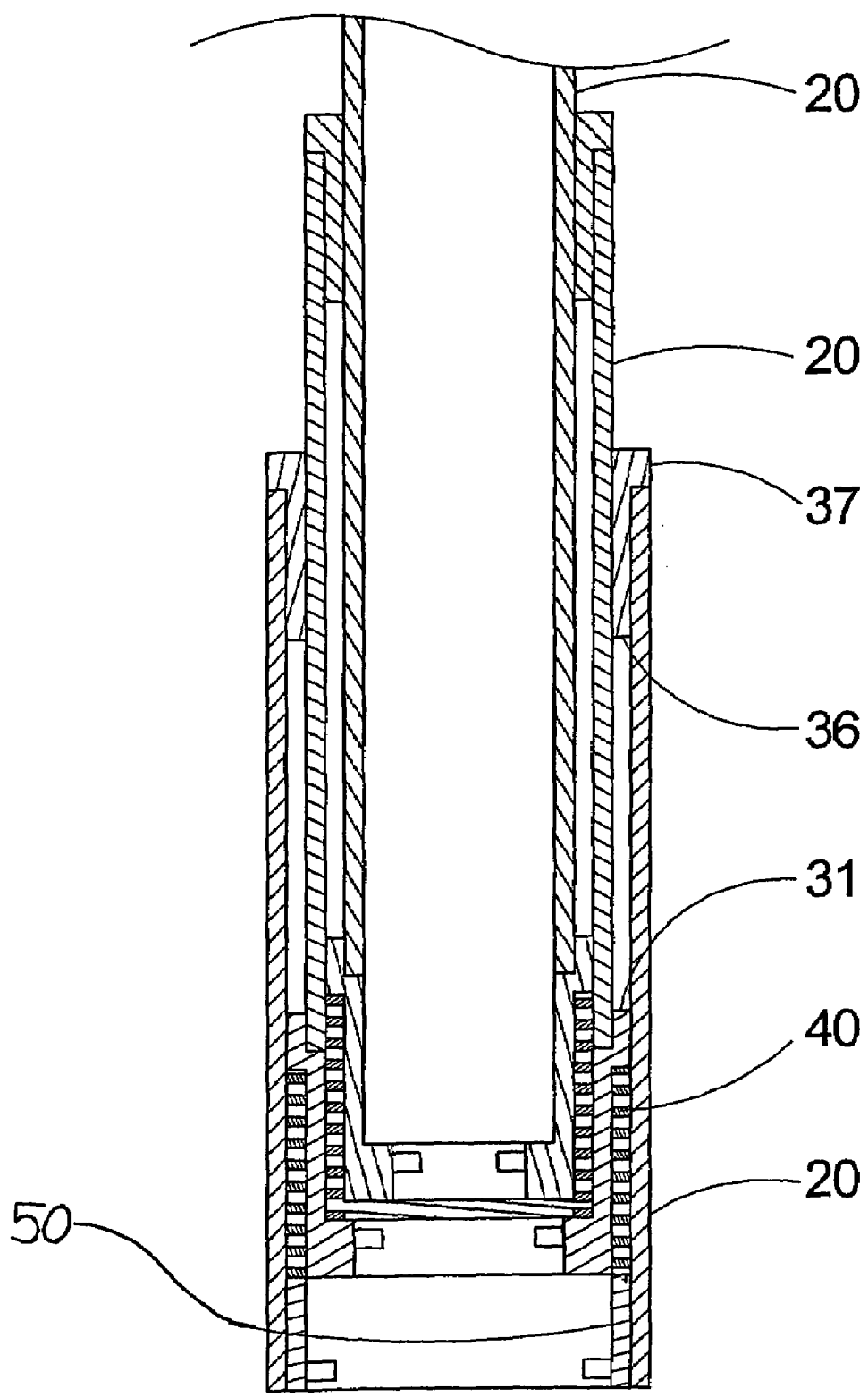
FIG. 2 is a schematic partial cross-sectional view of the present invention in a retracted position.
Figure 3:
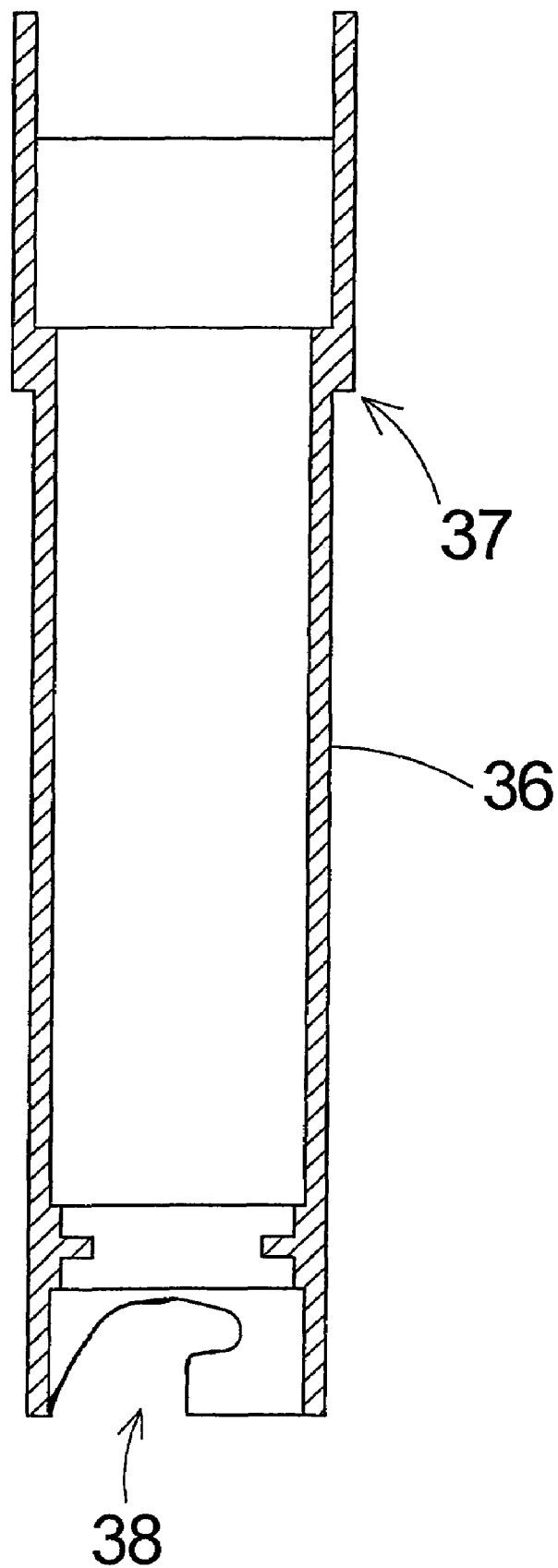
FIG. 3 is a schematic cross-sectional view of an upper sleeve member of the present invention taken along line 3-3 of FIG. 6.
Figure 4:
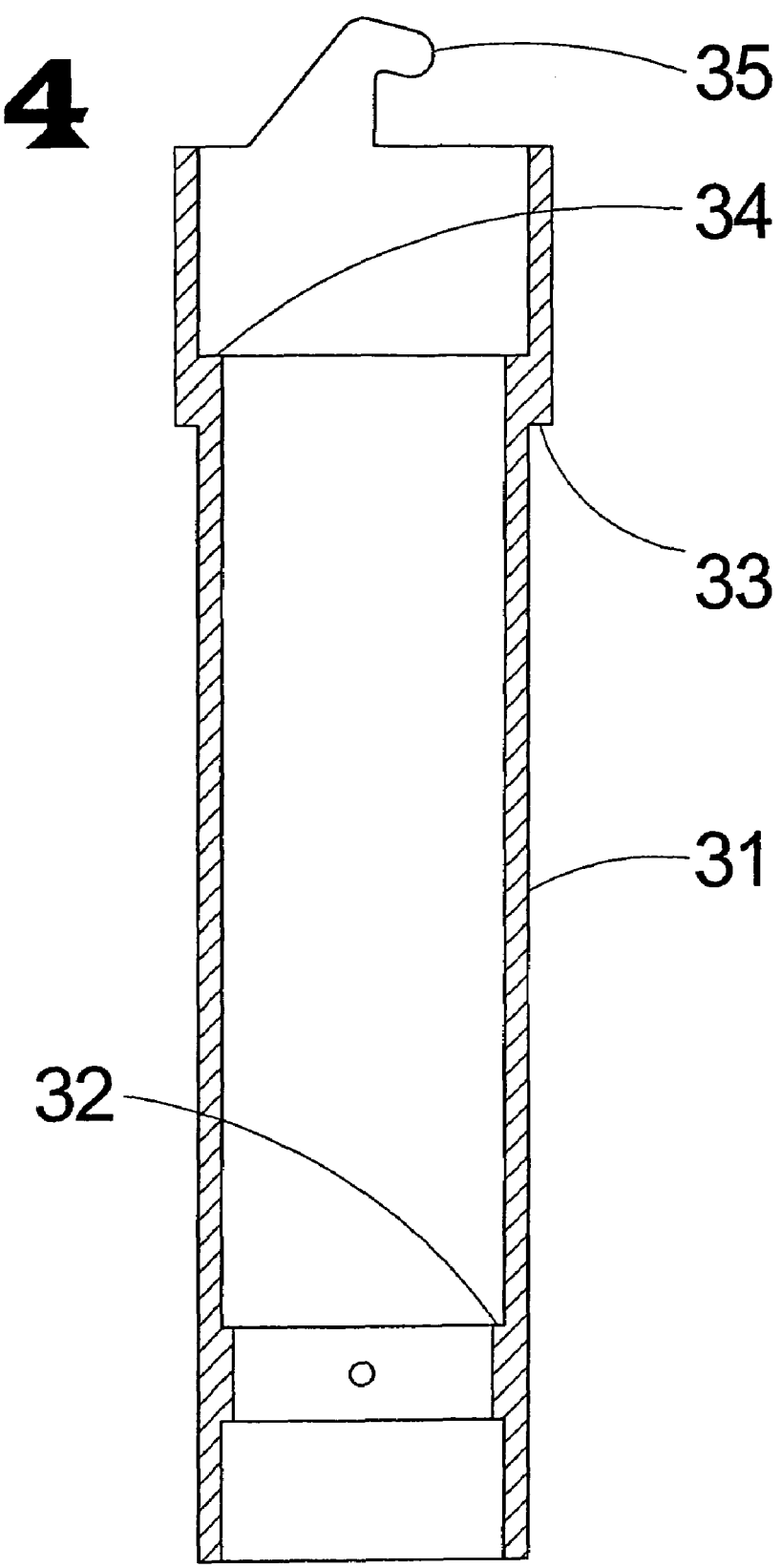
FIG. 4 is a schematic cross-sectional view of a lower sleeve member of the present invention taken along line 4-4 of FIG. 6.
Figure 5:
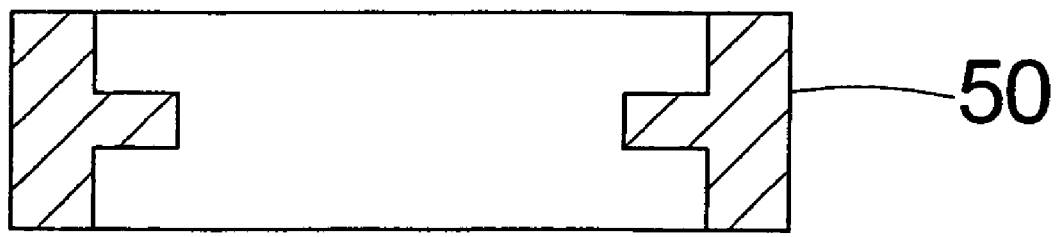
FIG. 5 is a schematic top view of a stop ring member of the present invention.
Figure 6:
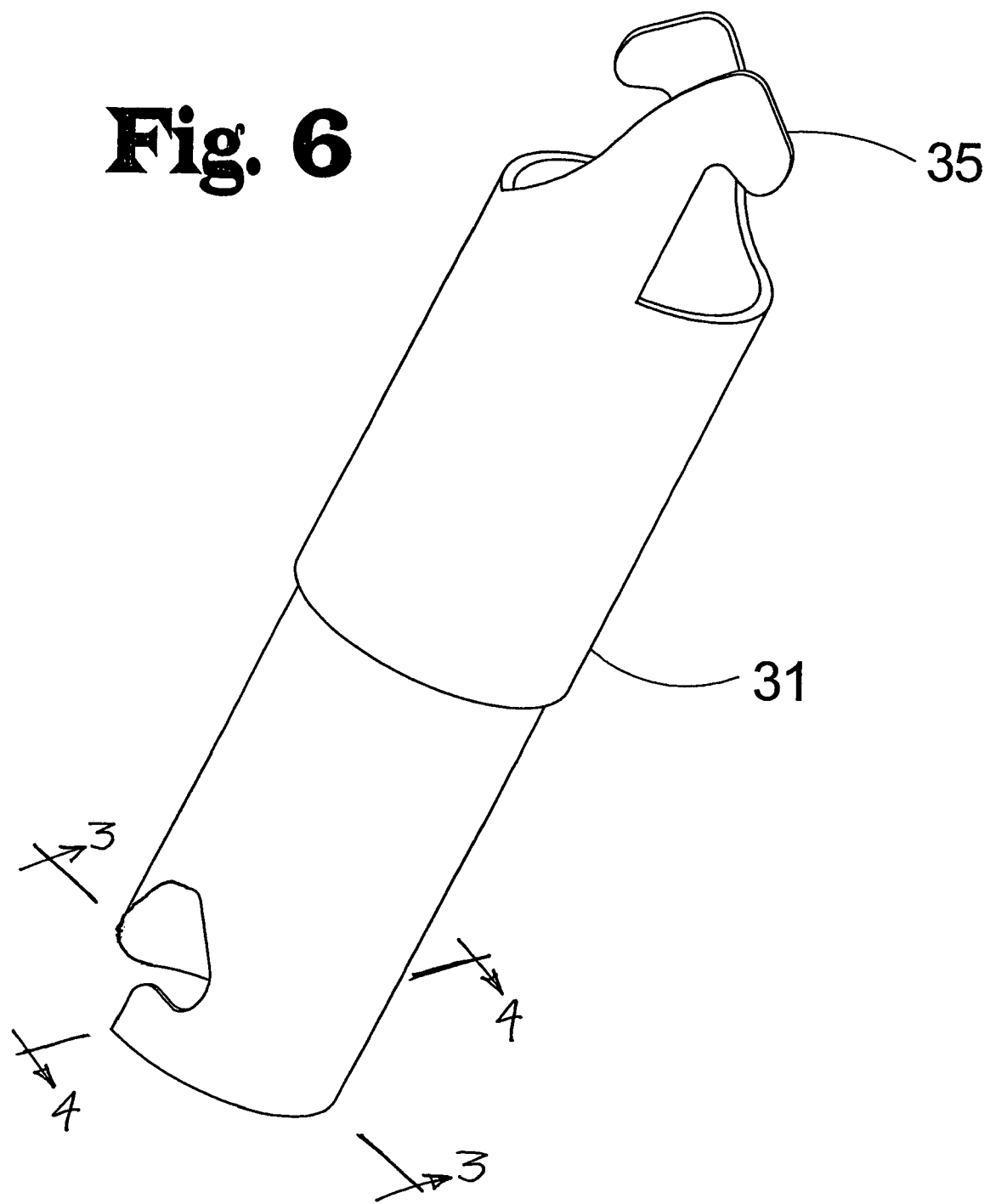
FIG. 6 is a schematic perspective view of the upper sleeve member of the present invention.
Figure 7:
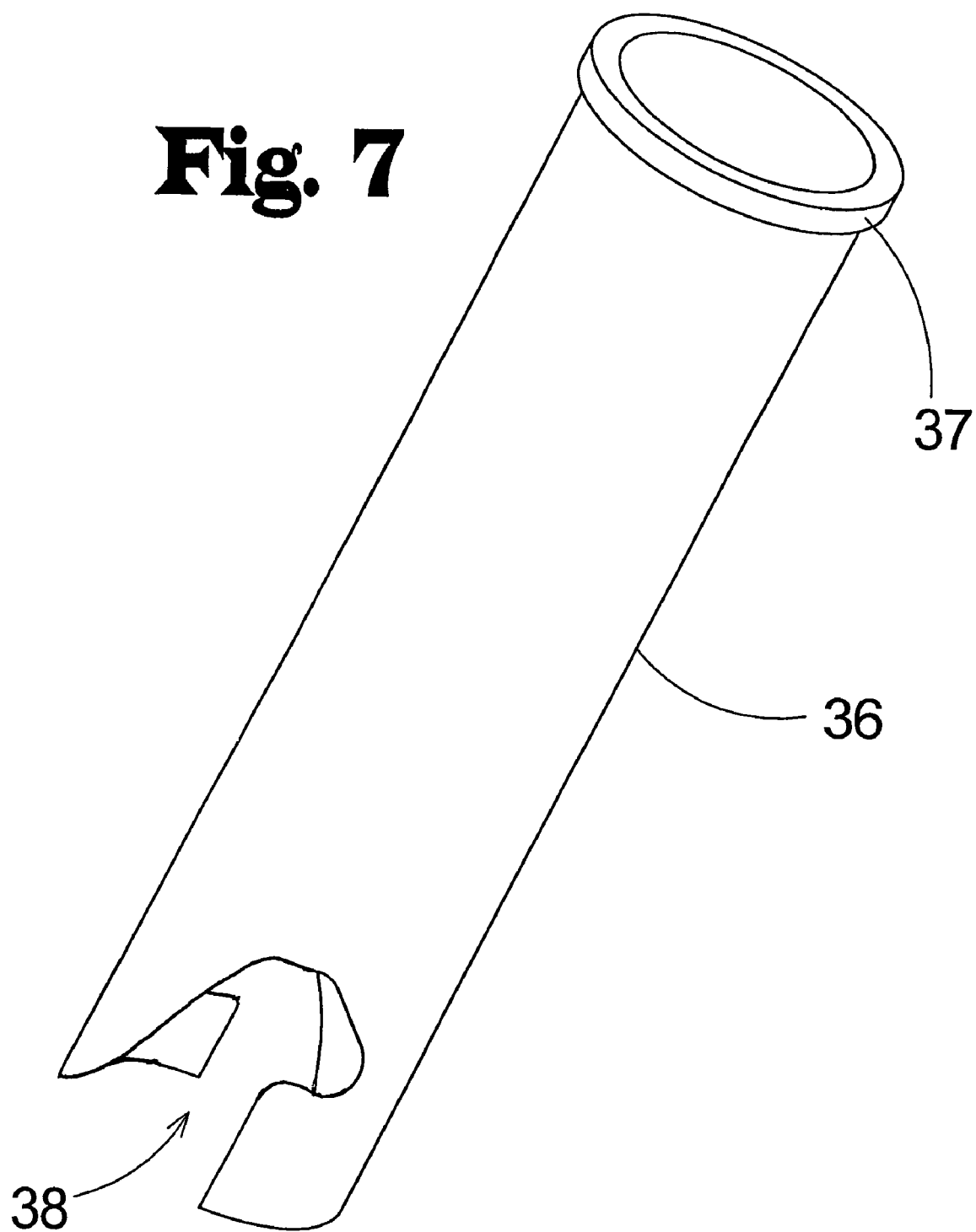
FIG. 7 is a schematic perspective view of an embodiment of the lower sleeve member of the present invention.

With reference now to the drawings, and in particular to FIGS. 1 through 7 thereof, a new flag pole embodying the principles and concepts of the present invention and generally designated by the reference numeral 10 will be described.

As best illustrated in FIGS. 1 through 7, the flag pole 10 generally comprises a plurality of segments 20, a plurality of sleeve assemblies 30, and a plurality of biasing means 40.

Preferably, the plurality of segments 20 includes a bottom segment 22, at least one intermediate segment 24, and a top segment 26. Each of the segments 20 comprises a rigid elongate cylindrical tube of a size to fit telescopically within the next adjacent lower tube.

A similar configuration is also contemplated using only a top segment 26, bottom segment 22, one sleeve assembly 30 and one biasing means 40.

The plurality of sleeve assemblies 30 facilitate telescopic movement of adjacent tubes. Each one of the sleeve assemblies 30 is positioned between an associated pairing of a relatively lower segment and a relatively higher segment.

Each one of the plurality of biasing means 40 urges an associate one of the segments 20 toward an extended position.

Most preferably, each one of the plurality of sleeve assemblies 30 further comprises an upper sleeve member 36 and a lower sleeve member 31. The upper sleeve member 36 is positionable to abut a top edge of the relatively lower one of the segments 20. The lower sleeve member 31 is positionable to abut a lower edge of the relatively higher one of the segments 20.

In a preferred embodiment, the lower sleeve member 31 further includes a lower stop portion 32, an upper stop portion 33, and a ledge portion 34. The lower stop portion 32 engages a bottom portion of an associated one of the biasing means 40 associated with the relatively higher segment. The upper stop portion 33 engages a top portion of an associated one of the biasing means 40 associated with the relatively lower segment. The ledge portion 34 is used for engaging a bottom edge of the relatively higher segment.

In a further embodiment, the upper sleeve member 36 includes a lip portion 37. The lip portion 37 abuts a top edge of the relatively lower segment.

Preferably, the upper sleeve member 36 selectively engages the lower sleeve member 31. Thus, the lower sleeve member 31 is maintained in a static position relative to the upper sleeve member 36. As the ledge portion 34 of the lower segment engages the bottom of a relatively higher segment, securing the lower sleeve member 31 to the upper sleeve member 36 secures the relatively higher segment in an extended position.

Most preferably, the upper sleeve member 36 includes a locking slot portion 38 positioned in a lower portion of its perimeter wall, and the lower sleeve member 31 includes a locking tab portion 35 extending from an upper portion of its perimeter wall. The locking tab portion 35 slideably engages the locking slot portion 38. Thus, rotating the upper sleeve member 36 with respect to the lower sleeve member 31 in a first direction engages the locking tab 35 into the locking slot 38 and rotating the upper sleeve member 36 with respect to the lower sleeve member 31 in a second direction disengages the locking tab 35 from the locking slot 38.

The biasing means 40 is preferably a spring member. In at least one embodiment, the spring member has a compressed overall length of approximately 9 inches, and an extended overall length of approximately 90 inches.

A stop ring member 50 may be positioned in a bottom portion of the bottom segment 22. The stop ring member 50 engages a bottom portion of a first one of the plurality of biasing means 40.

The assembly 10 may also include a plurality of retaining means 60. Each one of the plurality of retaining means 60 is associated with one of the segments 20 for selectively securing the segment 20 in a non-extended position.

In use, the desired height of the extended flagpole assembly will be determinative of the number of segments used, the length of each segment, and the diameter of each segment. As an illustrative example only, and not for purposes of limitation, the following table presents the configuration of three lengths of flagpoles contemplated by the present invention.

| Total Length | Depth into Ground | # of Segments | # of Biasing Means | Outer diameter of Segments (Inches) Segment # | | | | | |
|---|---|---|---|---|---|---|---|---|---|
| | | | | 1 | 2 | 3 | 4 | 5 | 6 |
| 20 Feet | 14" | 4 | 3 | 2.25 | 2.00 | 1.75 | 1.50 | — | — |
| 25 Feet | 16" | 5 | 4 | 2.50 | 2.25 | 2.00 | 1.75 | 1.50 | — |
| 30 Feet | 18" | 6 | 5 | 2.75 | 2.50 | 2.25 | 2.00 | 1.75 | 1.50 |

Once the flagpole has been installed, the user couples the flag to be displayed to the top segment. The user then raises the top segment to its fully extended position and rotates the top segment until the locking tab portion of the first lower sleeve member engages the locking slot portion of the first upper sleeve member. The user then raises and secures each subsequent segment in a similar manner. To lower the flag pole, the process is simply reversed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A telescopic flag pole assembly comprising:

a bottom segment, at least one intermediate segment, and a top segment, each of said segments comprising a rigid elongate cylindrical tube of a size to fit telescopically within the next adjacent lower tube;

a plurality of sleeve assemblies to facilitate telescopic movement of the adjacent tubes, each one of said sleeve assemblies being positioned between an associated pairing of a relatively lower segment and a relatively higher segment; and wherein each one of said plurality of sleeve assemblies comprises:

an upper sleeve member positionable to abut a top edge of said relatively lower one of said segments; and a lower sleeve member positionable to abut a lower edge of said relatively higher one of said segments;

wherein said upper sleeve member and said lower sleeve member are configured to selectively engage each other such that said lower sleeve member is capable of being maintained in a static position relative to said upper sleeve member, a locking slot being defined on said upper sleeve member at position in a lower portion of a perimeter wall, a locking tab being defined on said lower sleeve member and extending from an upper portion of a perimeter wall, said lower sleeve member having a central longitudinal axis, a reference plane extending perpendicular to said central longitudinal axis;

wherein said locking slot is defined by a slot edge of said perimeter wall, said slot edge extending at an inclined angle with respect to said reference plane, and wherein said locking tab is defined by a tab edge of said perimeter wall, said tab edge extending at said inclined angle with respect to said reference plane such that rotating said upper sleeve member with respect to said lower sleeve member in a first direction engages said locking tab into said locking slot and rotating said upper sleeve member with respect to said lower sleeve member in a second direction disengages said locking tab from said locking slot.

2. The assembly of claim 1, wherein said lower sleeve member further comprises a lower stop portion, said lower stop portion engaging a bottom portion of an associated one of said biasing means associated with said relatively higher segment.

3. The assembly of claim 1, wherein said lower sleeve member further comprises an upper stop portion, said upper stop portion engaging a top portion of an associated one of said biasing means associated with said relatively lower segment.

4. The assembly of claim 1, wherein said lower sleeve member further comprises a ledge portion for engaging a bottom edge of said relatively higher segment.

5. The assembly of claim 1, wherein said lower sleeve member further comprises:
 a lower stop portion, said lower stop portion engaging a bottom portion of an associated one of said biasing means associated with said relatively higher segment;
 an upper stop portion, said upper stop portion engaging a top portion of an associated one of said biasing means associated with said relatively lower segment; and
 a ledge portion for engaging a bottom edge of said relatively higher segment.

6. The assembly of claim 1, wherein said upper sleeve member further comprises a lip portion, said lip portion abutting a top edge of said relatively lower segment.

7. The assembly of claim 1, additionally comprising at least one biasing means for biasing at least one of said segments toward an extended position with respect to another one of said segments.

8. The assembly of claim 1 wherein said inclined angle is approximately 45 degrees with respect to said reference plane.

9. The assembly of claim 1 wherein an uppermost edge of aid locking tab defines a point that tapers wider toward a lowermost portion of said locking tab.

10. A telescopic flag pole assembly comprising:
 a bottom segment, at least one intermediate segment, and a top segment, each of said segments comprising a rigid elongate cylindrical tube of a size to fit telescopically within the next adjacent lower tube;
 a plurality of sleeve assemblies to facilitate telescopic movement of the adjacent tubes, each one of said sleeve assemblies being positioned between an associated pairing of a relatively lower segment and a relatively higher segment;
 wherein each one of said plurality of sleeve assemblies further comprises:
  an upper sleeve member positionable to abut a top edge of said relatively lower one of said segments;
  a lower sleeve member positionable to abut a lower edge of said relatively higher one of said segments;
  wherein said upper sleeve member and said lower sleeve member are configured to selectively engage each other such that said lower sleeve member is capable of being maintained in a static position relative to said upper sleeve member, a locking slot being defined on said upper sleeve member at position in a lower portion of a perimeter wall, a locking tab being defined on said lower sleeve member and extending from an upper portion of a perimeter wall, said lower sleeve member having a central longitudinal axis, a reference plane extending perpendicular to said central longitudinal axis;
  wherein said locking slot is defined by a slot edge of said perimeter wall, said slot edge extending at an inclined angle with respect to said reference plane, and wherein said locking tab is defined by a tab edge of said perimeter wall, said tab edge extending at said inclined angle with respect to said reference plane such that rotating said upper sleeve member with respect to said lower sleeve member in a first direction engages said locking tab into said locking slot and rotating said upper sleeve member with respect to said lower sleeve member in a second direction disengages said locking tab from said locking slot;
 said lower sleeve member further comprises:
  a lower stop portion, said lower stop portion engaging a bottom portion of an associated one of said biasing means associated with said relatively higher segment;
  an upper stop portion, said upper stop portion engaging a top portion of an associated one of said biasing means associated with said relatively lower segment;
  a ledge portion for engaging a bottom edge of said relatively higher segment;
  said upper sleeve member further comprises a lip portion, said lip portion abutting a top edge of said relatively lower segment.

11. A telescopic flag pole assembly comprising:
 a bottom segment, and a top segment, each of said segments comprising a rigid elongate cylindrical tube, said top segment being of a size to fit telescopically within said bottom segment;
 a sleeve assembly to facilitate telescopic movement of said tubes, said sleeve assembly being positioned between said bottom segment and said top segment;
 said sleeve assembly further comprises:
  an upper sleeve member positionable to abut a top edge of said bottom segment; and
  a lower sleeve member positionable to abut a lower edge of said top segment;
  wherein said upper sleeve member and said lower sleeve member are configured to selectively engage each other such that said lower sleeve member is capable of being maintained in a static position relative to said upper sleeve member, a locking slot being defined on said upper sleeve member at position in a lower portion of a perimeter wall, a locking tab being defined on said lower sleeve member and extending from an upper portion of a perimeter wall, said lower sleeve member having a central longitudinal axis, a reference plane extending perpendicular to said central longitudinal axis;
  wherein said locking slot is defined by a slot edge of said perimeter wall, said slot edge extending at an inclined angle with respect to said reference plane, and wherein said locking tab is defined by a tab edge of said perimeter wall, said tab edge extending at said inclined angle with respect to said reference plane such that rotating said upper sleeve member with respect to said lower sleeve member in a first direction engages said locking tab into said locking slot and rotating said upper sleeve member with respect to said lower sleeve member in a second direction disengages said locking tab from said locking slot.

12. The assembly of claim 11, wherein said upper sleeve member further comprises a lip portion, said lip portion abutting a top edge of said relatively lower segment.

13. The assembly of claim 11 wherein said inclined angle is approximately 45 degrees with respect to said reference plane.

14. The assembly of claim 11 wherein an uppermost edge of said locking tab defines a point that tapers wider toward a lowermost portion of said locking tab.

* * * * *